Adriano Bombardieri
INVENTOR

Adriano Bombardieri
INVENTOR.

Adriano Bombardieri
INVENTOR.

United States Patent Office 3,340,825
Patented Sept. 12, 1967

3,340,825
MIXING-METERING DEVICE FOR ICE-CREAMS
Adriano Bombardieri, Vicola San Benedetto 2,
Azzano, Italy
Filed Dec. 22, 1965, Ser. No. 515,645
Claims priority, application Italy, Dec. 28, 1964,
27,569/64
7 Claims. (Cl. 107—31)

The present invention relates to a mixing-metering device for incorporating air in creams to be frozen in order to obtain the so-called soft ice-creams.

The devices in use at present for incorporating air in creams to be frozen are well known; such devices generally consist of a rotary pump for the air and another pump for the cream or of an air compressor and a pump for the cream mix to be frozen and similar systems.

These known devices generally have the disadvantage of permitting neither an adjustment of the air-cream metering within the admitted dosage ratio nor a sufficiently homogeneous air-cream mix to be obtained.

It is the main object of this invention to obviate the aforementioned disadvantages by providing a device ensuring the desired metering of air-cream proportions and a correct homogeneity of said mix.

It is another object of this invention to ensure the automatic adjustment of the air-cream mix quantity to be frozen.

A further object of this invention is to provide a continuous operation of the device so as to obtain economically convenient products.

These and still other objects are attained by a mixing-metering device according to the invention, for introducing air in creams to be frozen for obtaining soft ice-creams, characterized in that in a basin filled with cream a hollow member defining a metering chamber is provided immersed in the cream, said hollow member having a cream discharge opening at the bottom thereof, cream inlet openings at the sides thereof, a first compressed air inlet at the top thereof and a second compressed air inlet which opens the cream discharge opening and valve means controlling said inlets and said discharge opening respectively.

Further characteristic features and advantages of the present invention will become more apparent from the following detailed description of a few preferred non-limiting embodiments of the mixing metering device, according to the present invention, when taken in conjunction with the accompanying drawings, in which.

Figure 1:
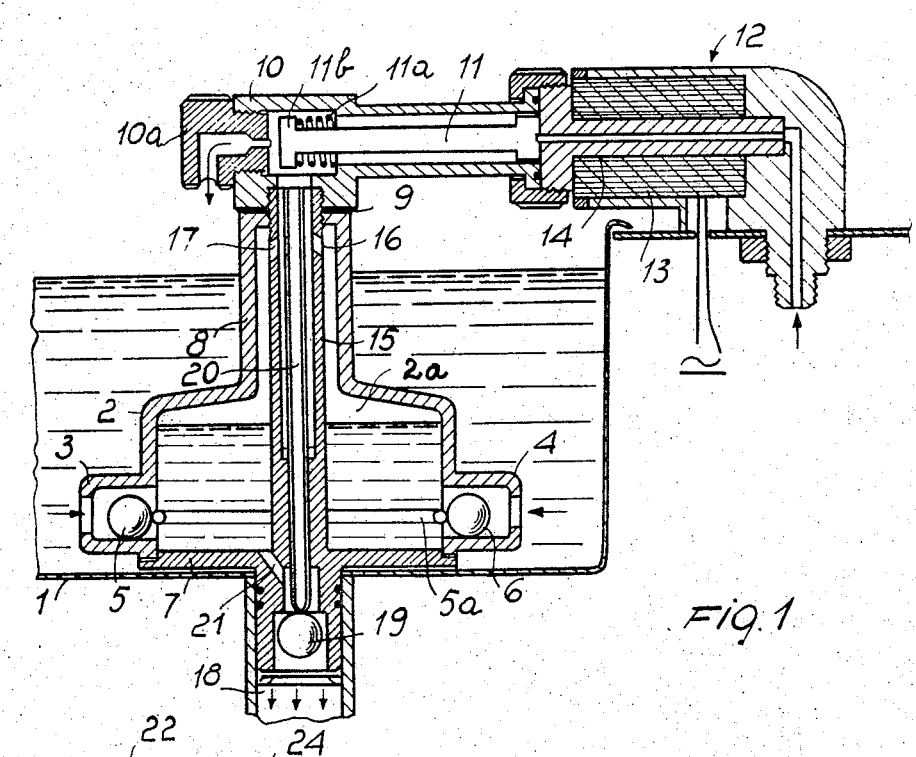
FIG. 1 is an elevational section view of a first embodiment of the mixing-metering device.

Referring now to the drawings, the mixing-metering device according to the present invention comprises a basin 1, adapted to contain cream, and in which is arranged a bell-like member 2 defining a metering chamber 2a having substantially a cylindrical shape, provided on the lower part with radial cylindrical bosses 3–4 serving as seats of respective ball valves 5–6 and resting upon the plate 7, which is removably secured to said member 2.

Said member 2 extends upwardly in a pipe 8 which supports, with at least a gasket 9 interposed therebetween a horizontal duct 10 extending to the right of said member 2. Inside said duct 10 there is disposed a control rod 11, actuated by the solenoid or electromagnet 12, provided at the right hand end of said duct 10. Said solenoid 12 is obtained by winding turns 13 on a magnetic mass 14, provided with a central through-hole to ensure a passage for the compressed air coming from a source (not shown). A spring 11a, placed between a collar 11b of the rod 11 and an inner shoulder of the duct 10, pushes under rest conditions said rod 11 to the left-hand side against the breather pipe 10a formed in a plug closing member.

Inside the pipe 8 is coaxially arranged another pipe 15 integral with the plate 7, having on the upper end part the holes 16–17 and at the lower end extending into a discharge portion 18, provided with a nonreturn ball valve 19 held in end positions by stops (not shown), which may be of resilient type.

Inside said pipe 15 a substantially capillary duct 20 is coaxially disposed, which is designed to pipe compressed air to mix up with the cream downstream of the valve 19. In fact, the chamber 2a communicates with the discharge duct 18 via at least one hole 21.

Referring to FIG. 1, the device according to the present invention operates as follows:

When the solenoid 12 is de-energized, compressed air can be introduced through the body 14 of the solenoid into the duct 10 (in fact, in this phase the control rod 11 is displaced to the left-hand side by means of the spring 11a to shut off the breather pipe 10a). A portion of this air under pressure in the duct 10 passes through the pipe 20 to the discharge means 18, whilst another portion getting through the holes 16 and 17 runs into the pipe 8 and exerts a certain pressure on the cream contained in the chamber 2a. Such pressure is consequently transmitted to the valves 5 and 6 which move in closing position thus preventing the cream contained in the chamber 2a to pass into the basin 1 through valves 3 and 4. Due to said pressure the cream flows down via the hole 21 to the discharge opening 18, where upon meeting the air coming from the pipe 20 it mixes up with it and proceeds towards the freezer (not shown in FIG. 1). When the freezer is entirely full, the cream-air mix contained therein presses upon the ball valve 19 so as to shut off the flow of compressed air.

At this stage the solenoid 12 is excited either by manual control or by a control system (not shown), and the rod 11 which is attracted by the core 14 displaces to the right against the action of the spring 11a (position in FIG. 1), thus closing the central duct of the core 14 (namely shutting off compressed air inlet) and opening at the same time the breather pipe 10a. In such manner, the air contained in the chamber 2a and the pipe 20 may be blown off via the breather pipe 10a whilst, with the pressure dropping in the chamber 2a, the valves 5 and 6 open thereby allowing the passage of cream from the basin 1 to the chamber 2 for a new loading (the ball valves 5 and 6 are withheld in this open position by a check ring 5a).

Figure 2:
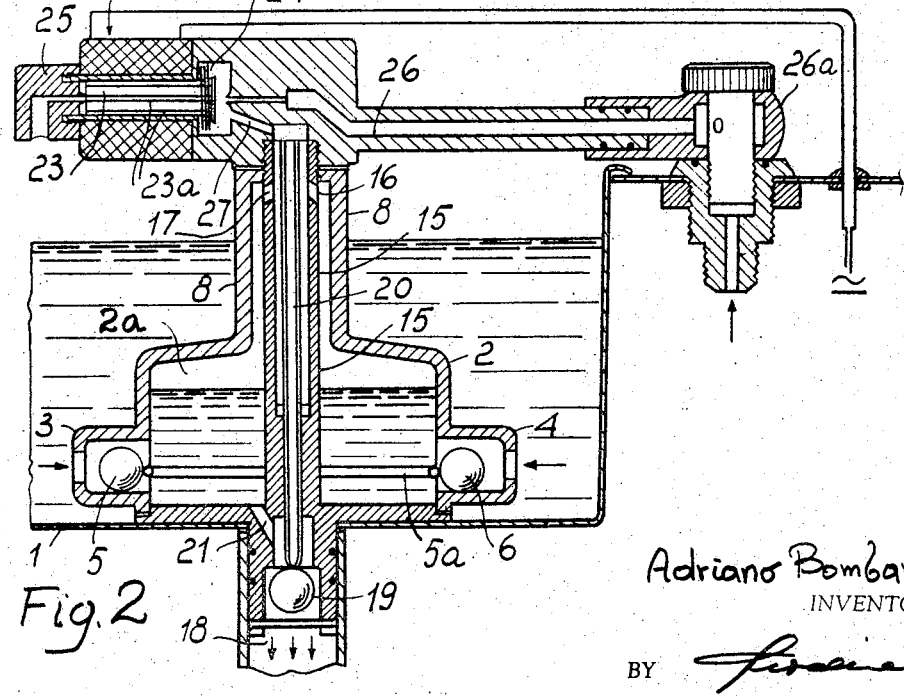
FIG. 2 is an elevational section view of the same device according to a second embodiment.

In FIG. 2 there is illustrated a second embodiment of the device having a solenoid 22 arranged at left-hand side and comprising a movable core 23 provided with superficial grooves 23a and associated with a return spring 24 (in FIG. 2 the elements which remained unchanged as compared in FIG. 1 are indicated with the same reference numbers).

The movable core 23 of the solenoid 22 can move within a cavity communicating on the one side with the breather pipe 25 and on the other side with the line 26 fastened to the connector 26a, connected to the compressed air source; on the same side the cavity, within which the core 23 moves, communicates with an inner duct 27 communicating in turn with the top of the pipes 15 and 20.

The operation of the device in the embodiment illustrated in FIG. 2 is substantially the same as for the embodiment in FIG. 1.

When the solenoid 22 is energized, the core 23 presses against the breather pipe 25 closing it (against the action exerted by the spring 24) and allows the passage of compressed air from the duct 26 to the inner duct 27. Air can thus reach the ducts 8, 15 and 20, and the mixing operation may consequently occur in an analogous manner as described above.

When instead the solenoid 22 is de-energized, the core 23 is displaced to the right by means of the spring 24, so that the duct 26 is shut off, thus preventing air from flowing into the mixer, whilst at the same time the vent 25 opens and the air contained under pressure in the mixer outflows via the duct 27 and the grooves 23a on the core 23.

With the above-described devices an effective air-cream mixing action will be practically obtained, as there exists the possibility of increasing at will (e.g. from 10% to 160%) the initial volume of the cream.

It is likewise possible to obtain a substantially exact metering of the mix components.

The energizing and de-energizing of the solenoid may be effected by suitable control means.

Figure 3:
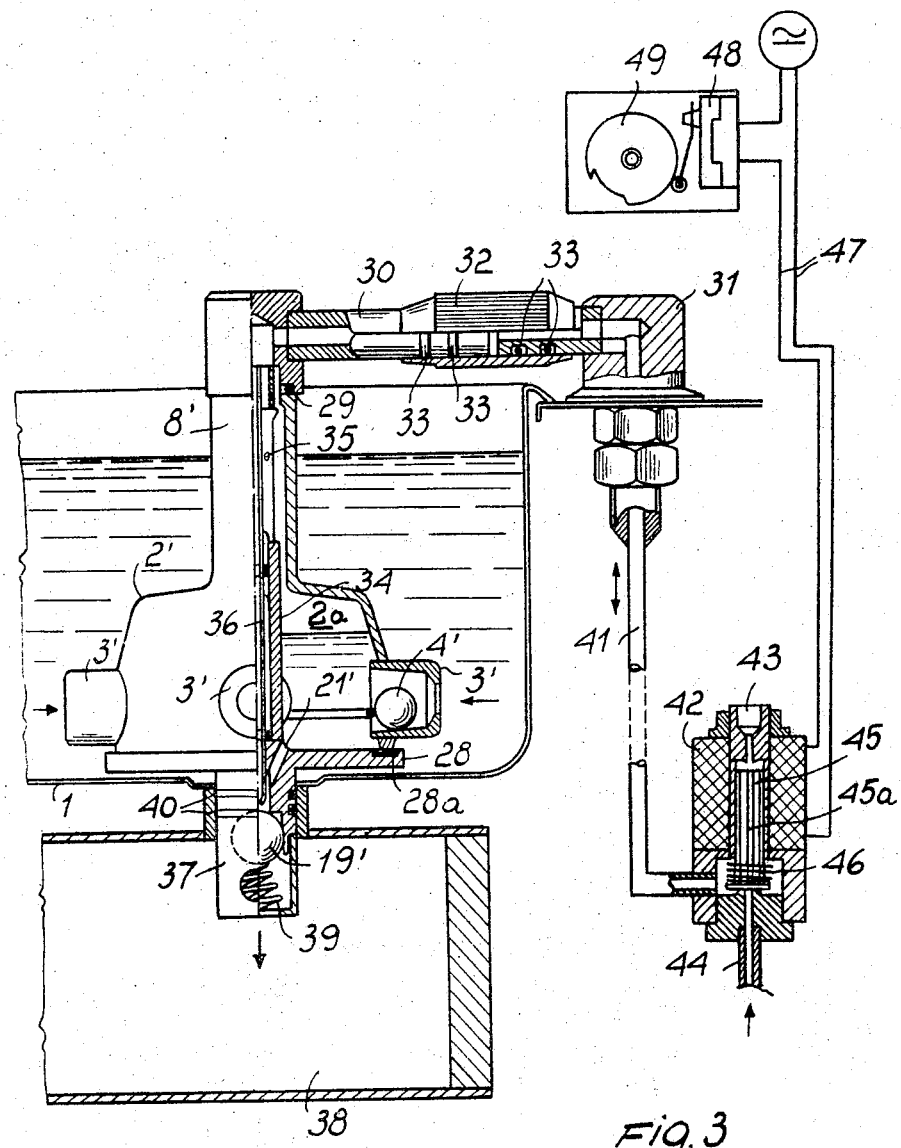
FIGS. 3-4 illustrate partly in elevational view and partly in section the same device according to a third and fourth embodiment, respectively.

In FIG. 3 there is represented the mixing-metering device according to a third embodiment of this invention. Such embodiment is particularly adapted to easily allow the assembling and disassembling of the apparatus.

Referring now to FIG. 3, the device comprises a bell-shaped metering member 2′ defining a chamber 2′ provided with four radial cylindrical bosses 3′, providing seats for the ball valves 4′; the chamber 2a similarly to the aforementioned embodiments is closed on the bottom by a plate 28 and the seal is provided by the peripheral gasket 28a.

Said member 2′ extends upwardly into the pipe 8′ which supports with a gasket 29 interposed therebetween a horizontal duct member 30 providing the movable connector which is in turn put into communication with the stationary connector 31 and is connected thereto by means of a sliding sleeve 32. Seal gaskets 33 are placed on the connectors 30 and 31 at the sleeve 32. Coaxially housed inside the pipe 8′ is another pipe 34 integral with the plate 28 and communicating with the chamber 2a via the openings 35. Inside the pipe 34 there is provided a substantially capillary duct 36 for the compressed air to be mixed up with the cream downstream of the discharge ball valve 19′. The latter is housed in the discharge duct 37 communicating at the lower part with the freezing pipe 38 and housing a spring 39, adapted to bringing back to its seat the valve 19′ under rest conditions, the communication between the discharge duct 37 and the chamber 2a being ensured by the openings 21′.

Seal gaskets 40 are associated with the discharge duct 37, which is removably mounted.

The stationary connector 31 supported by the carrying structure of the apparatus is in communication via the pipe 41 with the solenoid valve 42 having three ways one of which is the said duct 41, whilst the remaining two ways are constituted by the breather pipe 43 and compressed air inlet pipe 44.

The solenoid valve 42 consists in a known manner of a movable core 45 provided with peripheral grooves 45a and associated with a return spring 46. The cavity, inside which said core 45 is displaced, communicates at the upper end with the breather pipe 43 and at the lower end with the ducts 41 and 44. The control of the solenoid valve 42 occurs through the electrical wires 47 one of which is cyclically interrupted by means of the micro-switch 48 actuated by the cam 49 which is in turn rotated by a motor (not shown) actuated by a suitable control system.

The operation of the device of FIG. 3 is similar to that described above.

When the solenoid valve 42 is energized, compressed air is introduced via the ducts 44, 41 and 30 both into the chamber 2a and the capillary duct 36.

Also in this case, when the freezing pipe 38 is loaded, the air-cream mix contained therein shuts off due to back-pressure of the ball valve 19′ thus stopping the air flow.

The air under pressure contained in the chamber 2a, upon operation of the micro-switch 48, through which the electro-valve 42 is de-energized and the core 45 of which closes the duct 44 and puts at the same time the duct 41 into communication with the breather pipe 43, flows then in opposite direction in the duct 41 and blows off through the breather pipe 43; the decrease of internal pressure causes the opening of the valves 4′ and a new cream load from the basin 1 to the chamber 2′ is fed.

If is is desired to demount the mixing-metering device, it will just suffice to cause the sleeve 32 to be manually slid over the respective connector to release the movable connector 30 from the stationary connector 31. When this is accomplished, the assembly comprising the member 2′, the discharge means 37 and the pipes 34 and 36, may be removed by slipping it off upwardly.

As it can be noted, the disassembly operation (and similarly the assembly operation) can be quickly and easily carried out, whilst the fact of setting the solenoid valve 42 in a stationary position spaced apart from the mixer assembly ensures a considerable working safety since the related electric circuits are brought away from said assembly and set in a safety position.

Figure 4:
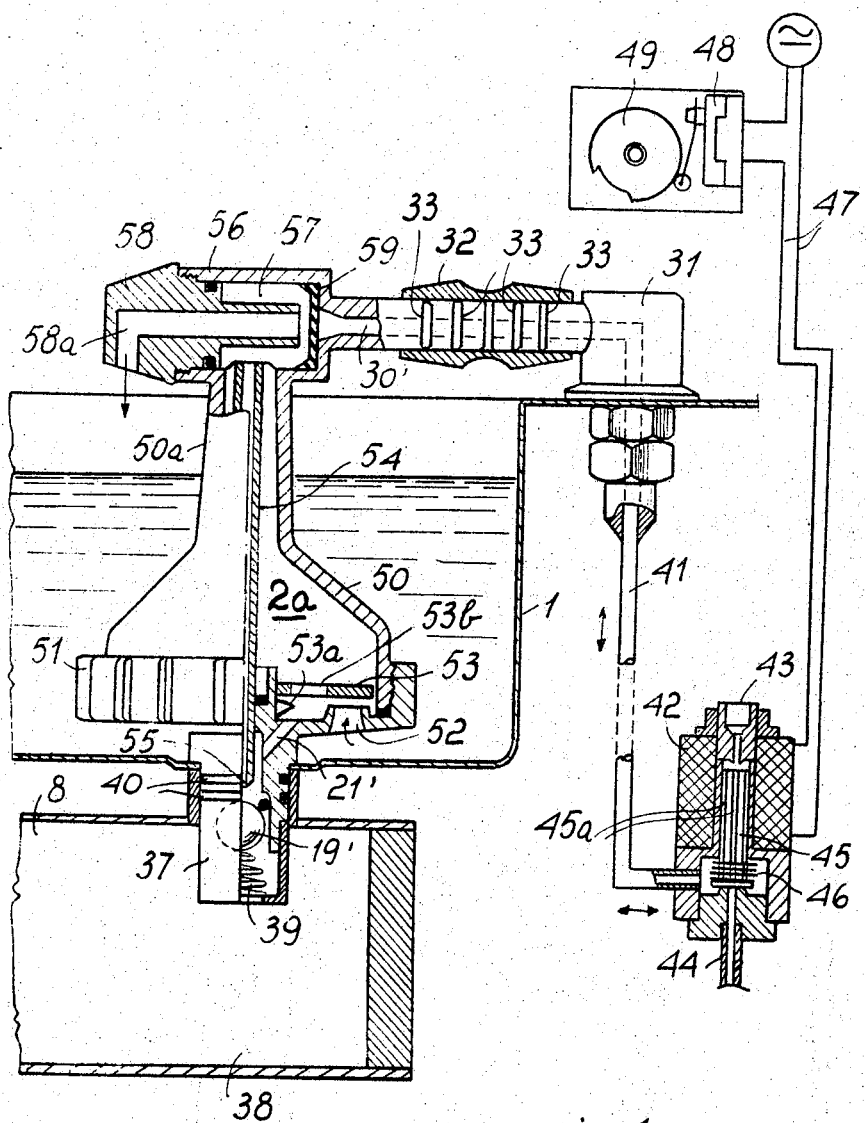

In FIG. 4 there is illustrated the mixing-metering device according to a fourth embodiment of this invention. Such embodiment permits to eliminate, as will be seen hereinbelow, the return-flow of the cream into the air ducts during the feeding restarting phase.

With reference to FIG. 4, the bell-shaped chamber member 50 disposed in the basin 1 is provided on the lower part substantially with a lid-like screw closure 51, which is in turn provided with holes 52, adapted to ensure the passage of the cream from the basin 1 into the inside of the chamber member 50. At the holes 52 a valve member 53 is provided which consists of a substantially annular movable flange, associated with elastic return means 53a, and adapted to close said holes 52 through holes 53b being provided at the center zone thereof.

Similarly to the embodiment illustrated in FIG. 3, on the lower part there is provided the discharge pipe 37, integral with the closing cover 51 and passing through an opening communicating with the freezer 38, the seal being ensured by the gaskets 40. The communication between the discharge pipe 37 and the chamber 2a is ensured by the passage holes 21′.

The capillary duct 54, coaxially housed into the chamber 50, terminates on the lower part with a nozzle 55 placed in proximity of the ball valve 19′.

The upper part 50a of the member 50 communicates with an elbow 56, provided with plug closing 58 comprising an inner breather conduit 58a. The elbow 56 shows an internal cavity 57 into which the ends of the ducts 50a and 54 lead and a substantially flexible diaphragm valve 59 is provided which is adapted to reciprocate and engage on the one side with the inlet of the breather pipe 58a and on the other side with the outlet of the connecting duct 30′, as better explained hereinbelow. The latter is joined with the stationary connector 31 via an outer sliding sleeve 32. The stationary connector 31 is supported on the carrying structure of the apparatus and communicates via a delivery pipe 41 with the solenoid valve 42 of the three-way type being arranged in a closely similar way to that relating to the embodiment of FIG. 3. The operation of the device shown in FIG. 4 is as follows:

When the solenoid electro-valve 42 is energized, compressed air is introduced into the duct 41. Due to the pressure difference existing between the duct 30′ and the inner cavity 57, the diaphragm 59 moves and is tightly urged against the breather pipe 58a. Furthermore, thanks to the diaphragm resilience features, a bending of the diaphragm 59 at the peripheral contour thereof occurs, which provides a continuous gap between the inside wall of the elbow 56 and the diaphragm 59 so that compressed air can flow to the capillary duct 54.

Compressed air flows also through the gap formed inside the duct 50a between the capillary duct 54 and the inner side wall of the duct 50a itself and puts the metering chamber 2a under pressure, thus lowering the displaceable ring 53, which shuts off the openings 52. In addition, the cream contained in the chamber 2a is caused to outflow to the discharge 37 via the holes 53b of the ring 53 and the ducts 21', mixing then with the air coming from the capillary duct 54.

When the freezing assembly 38 is full of cream, the ball valve 19' clogs its own seat shutting off the air flow. Upon tripping of the micro-switch 48 the air under pressure contained in the chamber 2a flows to the opposite direction into the duct 50a, displaces the valve 59 to right and blows off via the breather pipe 58a. In such a manner, a possible return due to suction of the cream to the duct 30' is avoided (possible small portions of cream sucked upwardly return to the basin 1 through the breather pipe 58a).

At the same time the decreasing of internal pressure causes the opening of the holes 52 since the flange 53 raises again biased by the spring-loaded means 53a; in this way passage of a new cream feed from the basin 1 to the chamber 2a takes place.

As it can be noted, the presence of the diaphragm valve 59 ensures a perfect operation of the device also in the restarting stages since upon a new introduction of compressed air through the ducts 30', 50a and 54 a dosed mixing of air and cream is immediately obtained, practically as though there had been no interruption at all.

The simplicity of the clogging device consisting of the ring 53 ensures further a perfect valve action relative to openings 52.

As mentioned above, in all embodiments, the control means of the device may be of hand-operated type or a suitable control system may be provided. The control system may be responsive to the pressure in the freezing pipe and the device may control the ratio of cream and air during the mixing stage.

The present invention is subject to several changes and modifications, all within the scope of this invention.

Whatever materials and dimensions could be practically employed depends upon application requirements, and furthermore all component members could be replaced with other technically equivalent parts.

I claim:

1. A mixing-metering device for introducing air into creams to be frozen for obtaining soft ice-creams, comprising a basin to be filled with cream, an opening in said basin, a hollow member in said basin and defining a metering chamber, said hollow member having means defining a discharge aperture at the bottom thereof, said means communicating with said opening, cream inlet openings in said hollow member and arranged lateral thereto, a first compressed air inlet at the top thereof and a second compressed air inlet which opens near said discharge aperture and valve means controlling said first and said second compressed air inlets, said discharge aperture and said cream inlet openings.

2. A device according to claim 1, wherein said first compressed air inlet is a pipe extending upwardly beyond said basin.

3. A device according to claim 1, wherein said second compressed air inlet is a capillary tube like conduit.

4. A device according to claim 1, wherein said first and said second compressed air inlets are coaxial pipes and include a common pressure chamber in communication therewith and having a vent, a conduit leading to a pressure source and controllable valve means in said conduit and adapted alternatively to shut off and to open said vent and said conduit.

5. A device according to claim 4, wherein said controllable valve has a movable spring biased valve member and an electromagnet adapted to shift and spring biased valve member in one operative position thereof.

6. A device according to claim 5, wherein said electromagnet includes an electric circuit comprising a switch and a rotating cam adapted to open and close said switch in pre-established intervals to energize and de-energize said electromagnet.

7. A device according to claim 1, wherein said first and second compressed air inlets are coaxial pipes and include a common pressure chamber in communication therewith and having a vent, a conduit leading to a pressure source and a controllable valve means in said conduit and adapted alternatively to shut off and to open said vent and said conduit and including further a movable diaphragm member between said chamber and said controllable valve means, and adapted to allow the fluid flow from said controllable valve means towards said chamber and to prevent fluid flow in the opposite direction.

No references cited.

WALTER A. SCHEEL, *Primary Examiner.*

J. M. BELL, *Assistant Examiner.*